US012604059B2

(12) United States Patent　　(10) Patent No.:　US 12,604,059 B2
Jiao et al.　　(45) Date of Patent:　Apr. 14, 2026

(54) METHOD, APPARATUS, DEVICE AND STORAGE MEDIUM FOR CONTROLLING MEDIA PLAYER APPLICATION

(71) Applicant: Beijing Zitiao Network Technology Co., Ltd., Beijing (CN)

(72) Inventors: Yubo Jiao, Beijing (CN); Yuhao Yang, Beijing (CN); Dejun Sun, Beijing (CN); Niwen Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 311 days.

(21) Appl. No.: 18/541,400

(22) Filed: Dec. 15, 2023

(65) Prior Publication Data

US 2024/0236427 A1　Jul. 11, 2024

(30) Foreign Application Priority Data

Jan. 6, 2023　(CN) .......................... 202310021033.3

(51) Int. Cl.
*G06F 3/0488*　(2022.01)
*H04N 21/472*　(2011.01)

(52) U.S. Cl.
CPC ..... *H04N 21/47202* (2013.01); *G06F 3/0488* (2013.01); *H04N 21/47217* (2013.01)

(58) Field of Classification Search
CPC .................................................... G06F 3/0488

(Continued)

(56) References Cited

U.S. PATENT DOCUMENTS 9,055,254 B2 * 6/2015 Selim ........................ H04N 5/50
10,496,705 B1 * 12/2019 Irani ................. G06F 16/90328

(Continued)

FOREIGN PATENT DOCUMENTS

CN　105706034 A　6/2016
CN　106664464 A　5/2017

(Continued)

OTHER PUBLICATIONS

International Search Report, International Patent Application No. PCT/CN/2024/070434, Mar. 20, 2024, with English translation (7 pages).

(Continued)

*Primary Examiner* — Reza Nabi
(74) *Attorney, Agent, or Firm* — Astute IP Law Group

(57)　　　　ABSTRACT

Embodiments of the present disclosure provide a method, apparatus, device and storage medium for controlling media player application. The method comprises: in response to detecting a predetermined user operation in a first user interface of the media playback application, presenting a second user interface of the media playback application, the second user interface comprising at least a first set of controls associated with media playback scenarios; receiving a user's selection of a target control in the first set of controls; and in response to the selection, switching a currently played first media item displayed on the first user interface to a second media item, the second media item selected from a media library associated with a target media play scenario corresponding to the target control. In this way, more accurate media recommendations can be provided.

18 Claims, 9 Drawing Sheets

(58) Field of Classification Search

USPC .......................................................... 715/716

See application file for complete search history.

(56) References Cited

U.S. PATENT DOCUMENTS

| | | | | |
|---|---|---|---|---|
| 11,265,623 | B2 * | 3/2022 | Watson | H04N 21/44016 |
| 2008/0235286 | A1 * | 9/2008 | Hutson | G11B 27/105 |
| 2011/0191677 | A1 * | 8/2011 | Morris | G06F 3/00 |
| | | | | 715/716 |
| 2012/0050185 | A1 * | 3/2012 | Davydov | G06F 3/04883 |
| | | | | 345/173 |
| 2014/0184471 | A1 * | 7/2014 | Martynov | G06F 21/6209 |
| | | | | 345/1.2 |
| 2014/0365890 | A1 * | 12/2014 | Lei | G06F 3/0484 |
| | | | | 715/719 |
| 2014/0365919 | A1 * | 12/2014 | Shaw | H04L 12/1822 |
| | | | | 715/753 |
| 2014/0365945 | A1 * | 12/2014 | Karunamuni | G06F 3/04886 |
| | | | | 715/773 |
| 2015/0309844 | A1 * | 10/2015 | Lowe | G06Q 30/0631 |
| | | | | 715/716 |
| 2019/0342357 | A1 * | 11/2019 | Mitic | H04L 65/60 |
| 2019/0369830 | A1 * | 12/2019 | Alonso Ruiz | G06F 3/0483 |
| 2021/0074289 | A1 * | 3/2021 | Bromand | G06F 3/167 |
| 2021/0295798 | A1 * | 9/2021 | Saita | G06F 1/1616 |
| 2022/0078497 | A1 * | 3/2022 | Rachoori | H04N 21/23892 |
| 2022/0179665 | A1 * | 6/2022 | Rathod | G06F 9/451 |
| 2023/0114681 | A1 * | 4/2023 | Varma | H04N 21/4532 |
| | | | | 725/14 |
| 2023/0388581 | A1 * | 11/2023 | Chen | H04N 21/4312 |
| 2024/0236427 | A1 * | 7/2024 | Jiao | G06F 3/0482 |
| 2024/0386893 | A1 * | 11/2024 | Yu | G06F 21/32 |
| 2025/0110756 | A1 * | 4/2025 | Kedia | G06F 3/04817 |
| 2025/0348192 | A1 * | 11/2025 | Tyler | G06F 3/04817 |

FOREIGN PATENT DOCUMENTS

| | | | | |
|---|---|---|---|---|
| CN | 109302538 | A | 2/2019 | |
| CN | 110113666 | A | 8/2019 | |
| CN | 113703651 | A | 11/2021 | |
| CN | 114564269 | A * | 5/2022 | G06F 16/438 |
| CN | 114564604 | A * | 5/2022 | G06F 3/04817 |
| CN | 114817731 | A * | 7/2022 | G06F 16/639 |
| CN | 115474085 | A | 12/2022 | |
| CN | 115982404 | A | 4/2023 | |

OTHER PUBLICATIONS

Office Action issued in Chinese Patent Application No. 202310021033. 3, May 30, 2024, with machine translation (36 pages).

Huanzhao Zheng, "Cultural Development in the Digital Age", Jinan University Press, First Edition, pp. 001-006 and 193-200, Oct. 31, 2022.

Chinese Office Action, issued in Chinese patent application No. 2023100210333, dated Nov. 16, 2023, 13 pages (translation enclosed).

Office Action for Chinese Patent Application No. 202310021033.3, mailed on Aug. 16, 2024, 17 pages.

Huazhang Technology, "Zero basics: WeChat applet development", Development of Wechat applet for zero-based learning, Machinery Industry Press, China Machine Press, 1st Edition, Jan. 31, 2020, 32 pages.

* cited by examiner

200

A PREDETERMINED USER OPERATION IN A FIRST USER INTERFACE OF THE MEDIA PLAYBACK APPLICATION IS DETECTED? — 210

YES

PRESENT A SECOND USER INTERFACE OF THE MEDIA PLAYBACK APPLICATION — 220

RECEIVE A USER'S SELECTION OF A TARGET CONTROL IN THE FIRST SET OF CONTROLS — 230

SWITCH A CURRENTLY PLAYED FIRST MEDIA ITEM DISPLAYED ON THE FIRST USER INTERFACE TO A SECOND MEDIA ITEM — 240

300A

301

305

302

303

304

300B

500A

500B

METHOD, APPARATUS, DEVICE AND STORAGE MEDIUM FOR CONTROLLING MEDIA PLAYER APPLICATION

FIELD

Example embodiments of the present disclosure generally relate to the field of computer technologies, and in particular, to a method, apparatus, device, and computer-readable storage medium for controlling media player applications.

BACKGROUND

At present, media playback applications such as music player applications are widely used due to their easy operation and rich audio sources. Such media playback applications often have media recommendation functions to provide media items that users may be interested in.

SUMMARY

In a first aspect of the present disclosure, a method for controlling a media player application is provided. The method comprises: in response to detecting a predetermined user operation in a first user interface of the media playback application, presenting a second user interface of the media playback application, the second user interface comprising at least a first set of controls associated with media playback scenarios; receiving a user's selection of a target control in the first set of controls; and in response to the selection, switching a currently played first media item displayed on the first user interface to a second media item, the second media item selected from a media library associated with a target media play scenario corresponding to the target control.

In a second aspect of the present disclosure, an apparatus for controlling a media player application is provided. The apparatus comprises: a presentation module configured to present a second user interface of the media playback application in response to detecting a predetermined user operation in a first user interface of the media playback application, the second user interface comprising at least a first set of controls associated with media playback scenarios; a receiving module configured to receive a user's selection of a target control in the first set of controls; and a switching module configured to, in response to the selection, switch a currently played first media item displayed on the first user interface to a second media item, the second media item selected from a media library associated with a target media play scenario corresponding to the target control.

In the third aspect of the present disclosure, an electronic device is provided. The device comprises at least one processing unit and at least one memory coupled to the at least one processing unit and storing instructions for execution by the at least one processing unit. The instructions, when executed by the at least one processing unit cause the device to perform the method of the first aspect.

In the fourth aspect of the present disclosure, a computer-readable storage medium is provided. The computer-readable storage medium stores a computer program that, when executed by a processor, implements the method of the first aspect.

It should be understood that the content described in the content section of the present invention is not intended to limit the key features or important features of the embodiments of the present disclosure, nor is it intended to limit the scope of the present disclosure. Other features of the present disclosure will be easily understood by the following description.

BRIEF DESCRIPTION OF THE DRAWINGS

In conjunction with the accompanying drawings and with reference to the following detailed description, the above and other features, advantages, and aspects of each embodiment of the present disclosure will become more apparent. In the drawings, the same or similar reference numerals indicate the same or similar elements, where.

DETAILED DESCRIPTION

Figure 1:
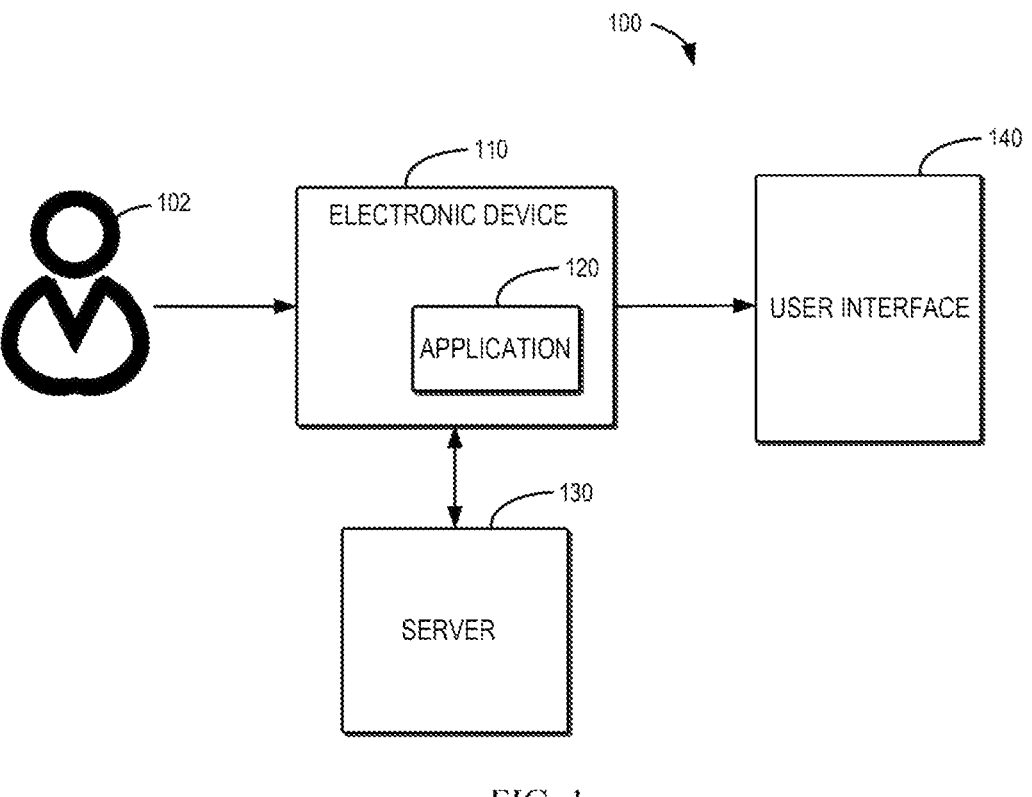
FIG. 1 shows a block diagram of an environment according to some embodiments of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions.

The term "in response to" indicates that the corresponding event occurs or the condition is satisfied. It will be understood that the timing of subsequent actions executed in response to the event or condition is not necessarily strongly related to the time when the event occurs or the condition is satisfied. In some cases, subsequent actions can be executed immediately when the event occurs or the condition is satisfied; in other cases, subsequent actions can also be executed after a period of time after the event occurs or the condition is satisfied.

It can be understood that the data involved in this technical solution (including but not limited to the data itself, the acquisition or use of data) should comply with the requirements of corresponding laws, regulations, and relevant provisions.

It will be appreciated that, before using the technical solutions disclosed in the embodiments of the present disclosure, the user should be informed of the type of personal information involved in the present disclosure, the scope of use, usage scenarios, etc. in an appropriate manner in accordance with relevant laws and regulations, and obtain the user's authorization.

Currently, in music player applications, user behaviors are usually combined with recommendation algorithms to predict music that users may be interested in. However, the recommendation scenarios provided to users are relatively single, and the acquisition channels for user behavior are also very limited. Therefore, it is expected to guide users to explore more diverse recommendation scenarios, thereby further obtaining diverse user preference information and optimizing the recommendation algorithms.

Given the above and other potential problems, embodiments herein provide a recommended solution in a media player application. For example, if a predetermined user operation is detected on the first user interface for media playback, a second user interface is presented. The second user interface includes at least a set of controls related to the media playback scenario. If a selection for at least one target control in the set of controls is received on the second user interface, the currently played media item displayed on the first user interface is switched to another media item which is selected from the media library associated with the target media playback scenario corresponding to the selected target control.

According to various embodiments of the present disclosure, users can be guided to select the media features or attributes they expect to play from different dimensions, especially from the perspective of media playback scenarios to explore more extended scenarios, thereby obtaining more targeted user media playback preference information which is useful to provide users with more accurate media recommendations. Moreover, users are enabled to consume more on the homepage of the media playback application.

The following describes the example embodiments of the present disclosure with reference to the accompanying drawings.

FIG. 1 shows a block diagram of an environment 100 in accordance with some embodiments of the present disclosure. As shown, in this example environment 100, an application 120 is installed in the electronic device 110. The user 102 may interact with the application 120 via the electronic device 110 and/or the attachment device of the electronic device 110. The application 120 may be an application for playing media content. For example, the application 120 may be a music player capable of providing the user 102 with functions such as music search, playback, sharing, etc. In the environment 100 of FIG. 1, the application 120 may present the user interface 140 so that the user can control media playback during use of the application 120.

In some embodiments, the electronic device 110 communicates with the server 130 to enable the provision of services to application 120. The electronic device 110 may be any type of mobile end point, fixed end point, or portable end point, including mobile phones, desktop computers, laptop computers, notebook computers, netbook computers, tablet computers, media computers, multimedia tablets, personal communication system (PCS) devices, personal navigation devices, personal digital assistants (PDAs), audio/ Mobile Pentiums 4, digital cameras/camcorders, positioning devices, television receivers, radio broadcast receivers, e-book devices, gaming devices, or any combination thereof, including accessories and peripherals of these devices or any combination thereof. In some embodiments, electronic device 110 can also support any type of user-specific interface (such as "wearable" circuits, etc.). The server 130 is various types of computing systems/servers capable of providing computing power, including but not limited to mainframes, Edge Computing nodes, computing devices in cloud environments, and so on.

It should be understood that the structure and functions of the environment 100 are described for illustrative purposes only, without suggesting any limitations as to the scope of the present disclosure.

Figure 2:
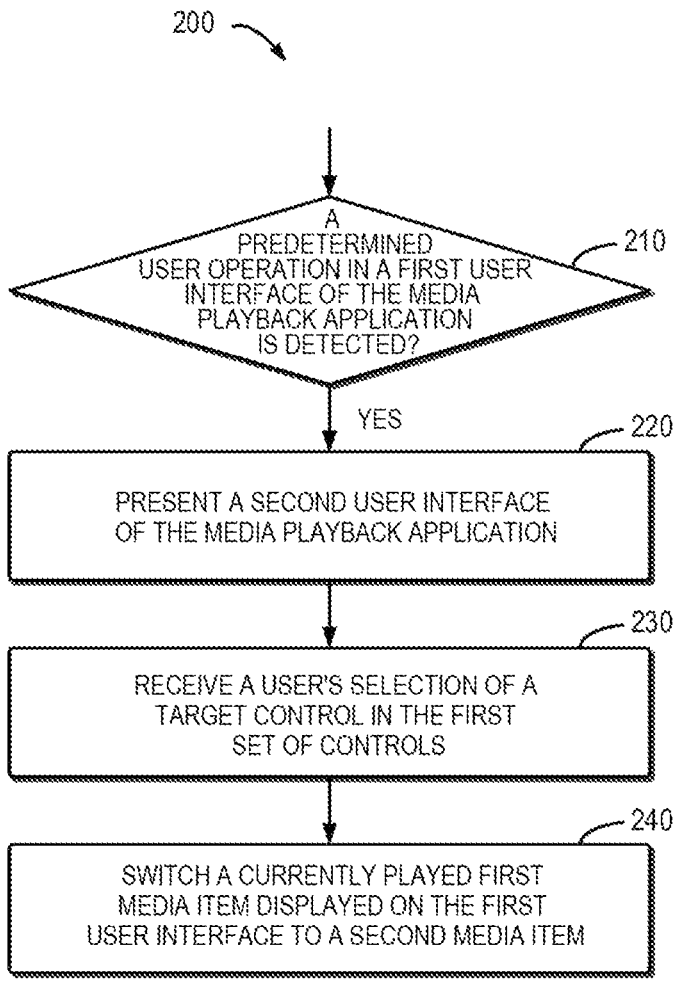
FIG. 2 shows a flowchart of an example process for controlling a media player application according to some embodiments of the present disclosure.

The following will continue to describe some example embodiments of the present disclosure with reference to the accompanying drawings. FIG. 2 illustrates a flowchart of a method 200 for controlling a media player application in accordance with some embodiments of the present disclosure. The method 200 may be performed by the electronic device 110 in FIG. 1. For ease of discussion, the electronic device 110 is described later as an example. However, this is merely for illustration without suggesting any limitations as to the scope of the present disclosure. It should be understood that embodiments of the present disclosure may also be performed by other suitable servers or electronic devices.

At block 210, if the electronic device 110 detects a predetermined user operation at the first user interface of the application 120, the electronic device 110 presents a second user interface of the media playback application at block 220. The second user interface may include at least a set of controls that guide the user to select a desired media playback scenario.

Figure 3A:
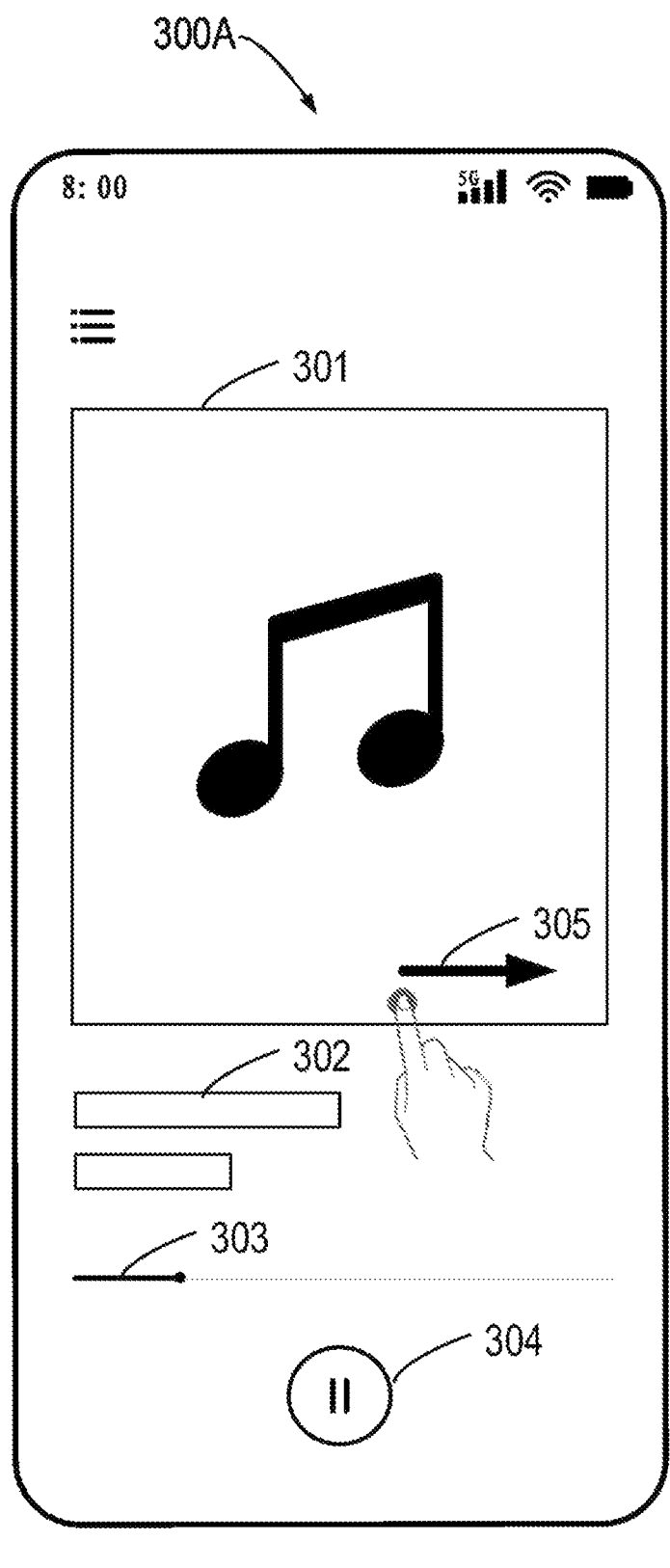
FIGS. 3A to 3C show schematic diagrams of user interfaces according to some embodiments of the present disclosure.
Figure 3B:
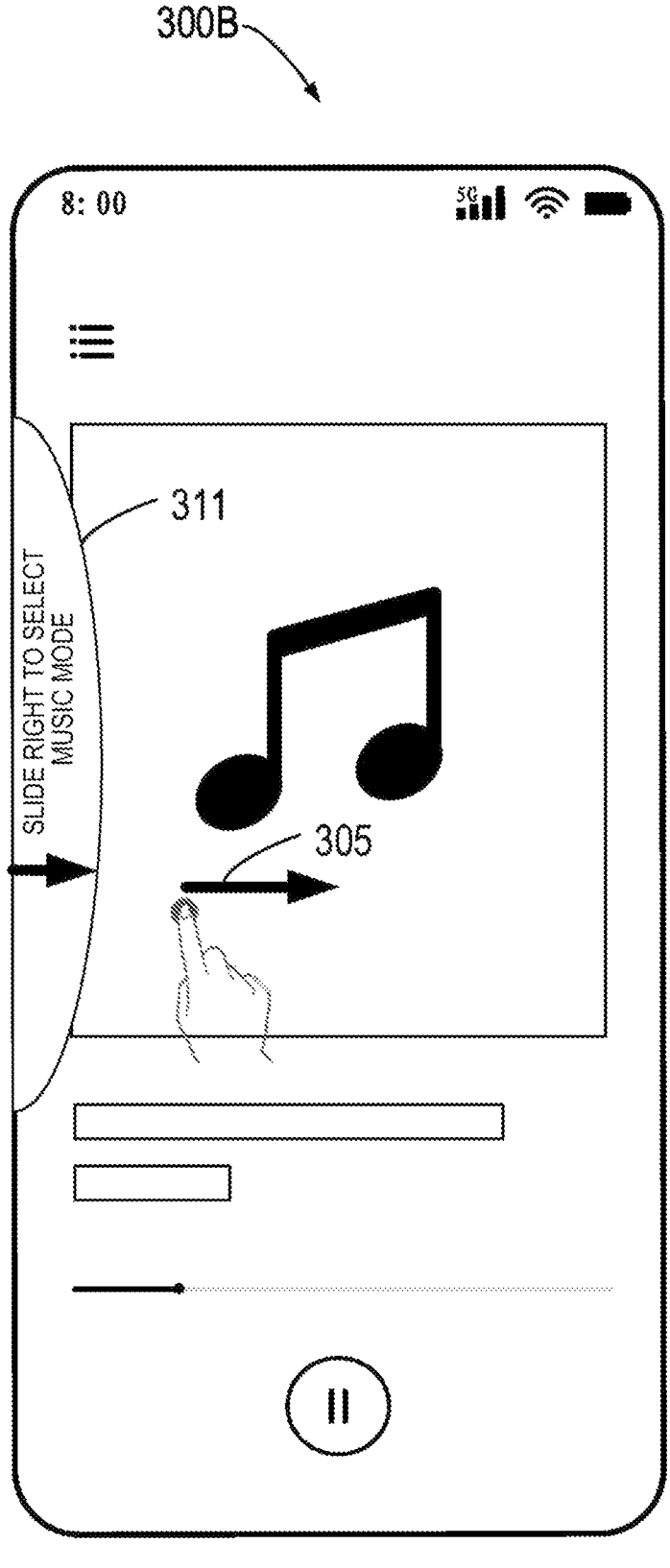
Figure 3C:
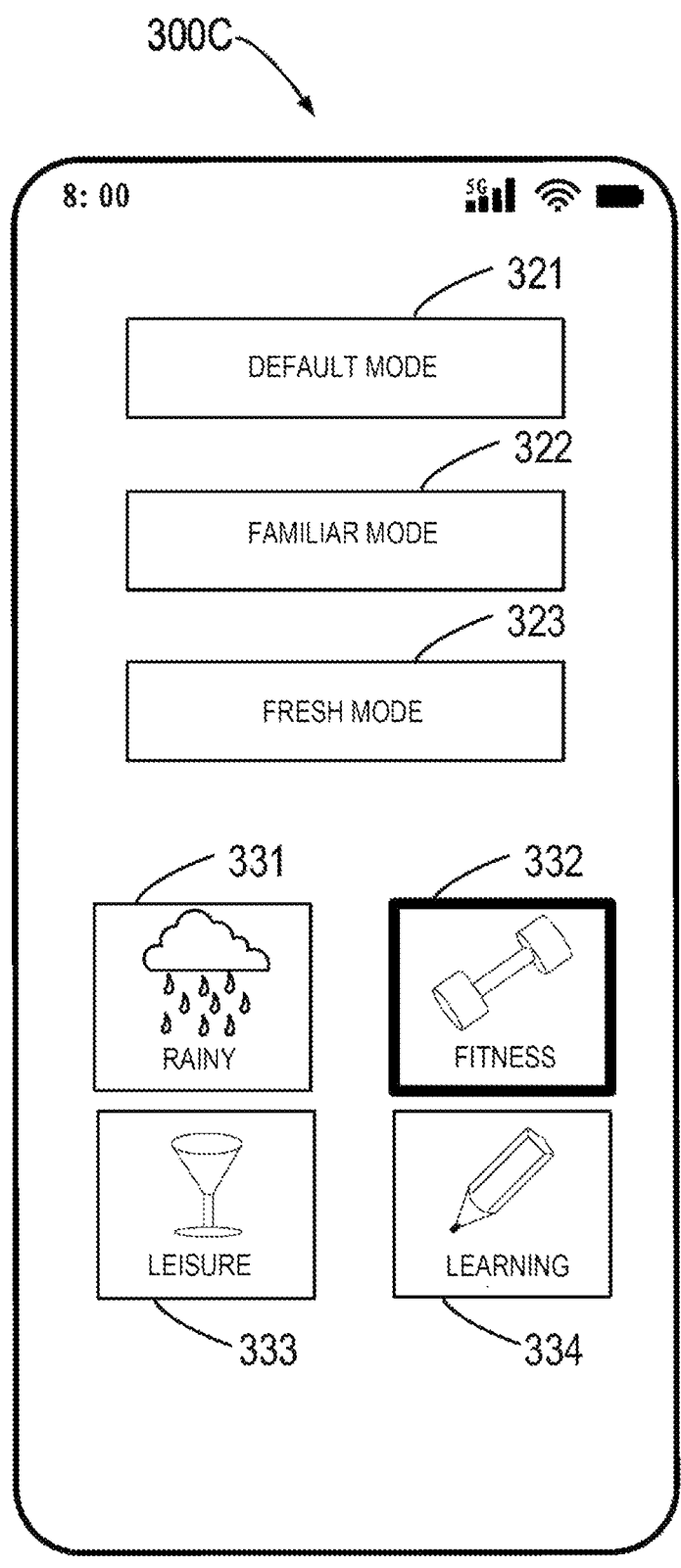

FIGS. 3A to 3C show example interfaces 300A, 300B, and 300C of the application 120, respectively, according to embodiments of the present disclosure.

The first user interface of the application 120 may be a media playback interface of the application 120, such as the interface 300A shown in FIG. 3A. The interface 300A may include an interface element 301 representing the currently played media item, an interface element 302 representing descriptive information of the currently played media item, an interface element 303 representing the playback progress of the currently played media item, and an interface element 304 for controlling the playback of the media item. It should be understood that the interface 300A may also include other interface elements related to the playback of the media item.

In some embodiments, if one or more sliding operations of the user 102 along a first direction 305 are detected on the interface 300A, the electronic device 110 may present a second user interface related to the media recommendation function, such as the interface 300C shown in FIG. 3C.

In other embodiments, an interface element that guides the user to perform an operation to access the second user interface may also be presented on the first user interface of the application 120. For example, an interface element 311 that guides the user to access the second user interface by performing a right sliding operation is provided in the interface 300B shown in FIG. 3B. In this case, if a sliding operation of the user 102 along the specified first direction 305 is detected on the interface 300B, the electronic device 110 may present a second user interface related to the media recommendation function, such as the interface 300C shown in FIG. 3C.

It should be understood that users can access the second user interface in other ways. For example, users can input a command to access the second user interface by another gesture or voice. In addition, the interface element guiding users to access the second user interface by performing specific operations can be presented in other forms of interface elements, not limited to those shown in interface 300B. For example, an interface element that guide users to access the second user interface by performing a specific operation can be a button as well. The user can access the second user interface by clicking on the button.

In this way, by providing a guide for the user to input playback preferences at the front end of the media playback application, the user can access a page for media recommendation with a very simple operation. This is particularly advantageous for media playback applications committed to accurate recommendation, as the user preference information can be quickly and effectively obtained.

For different client bases, the interface elements used to guide users into the second user interface can be displayed at different times. In some embodiments, for newly registered users of the application 120, the interface elements 311 used to access the second user interface can be displayed after a predetermined period of time after the user 102 completes his/her registration. In other embodiments, for those existing registered users of the application 102, the interface elements 311 used to access the second user interface can be displayed when a cold start of the media playback application is detected. In this way, it is possible to guide users to input preference information in a user-friendly manner during the use of the application, avoiding premature, late, or too rigid opportunities for guiding recommendations, thereby affecting the user experience.

As described above, the interface 300C is a user interface (i.e., the second user interface) related to the media recommendations of the application 120. It should be understood that the interface 300C can be slid into and presented on the electronic device 110 along the first direction 305 of the predetermined operation performed by the user 102 on the interface 300A or 300B, thereby replacing the interface 300A or 300B accordingly. Although not shown, the second user interface can also be presented in other ways. For example, the second user interface can be presented as a sidebar on a side of the interface 300A or 300B and slid into the screen in the first direction 305 to cover a portion of the interface 300A or 300B.

As shown in FIG. 3C, the interface 300C includes a first set of controls 331 to 334 that guide the user to select desired media playback scenarios, which respectively represent different media playback scenarios that the user may expect during the use of the media playback application. As an example, the first set of controls may include a control 321 for selecting the current default media playback mode, a control 322 for selecting media items with higher user familiarity for playback, and a control 323 for selecting media items with low user familiarity for playback. The second set of controls may include a control 331 for selecting media items recommended for playback in a rainy weather scenario, a control 332 for selecting media items recommended for playback in a fitness scenario, a control 333 for selecting media items recommended for playback in a leisure scenario, and a control 334 for selecting media items recommended for playback in a learning scenario.

It should be understood that the first set of controls included in the second user interface to guide the user to select a desired media playback scenario may also include controls corresponding to more candidate scenario items, and the scope of the present disclosure is not limited to what are shown in FIG. 3C.

Alternatively, or in addition, the interface 300C also includes a second set of controls 321 to 323 for adjusting media recommendation modes, which correspond to different media recommendation modes, respectively. For example, if the user selects "default mode", the media recommendation mode currently being used will not be changed. On the contrary, if the user selects "familiar mode", it means that the user expects to receive recommendations for media items that they often listen to, and if the user selects "fresh mode", it means that the user expects to receive recommendations for media items that they have not heard of and/or have listened to less frequently.

It should be understood that the above media recommendation modes and media playback scenarios are only for example without suggesting any limitations as to the scope of the present disclosure. Additions, modifications, and deletions to the example controls shown in interface 300C are considered to fall within the scope of this application without departing from the overall framework.

Alternatively, or in addition, in some other embodiments, the electronic device 110 may also present other controls related to the media recommendation function of the media playback application. For example, the electronic device 110 may present a control to guide the user to input his/her current mood. In some other embodiments, the electronic device 110 may also present a third set of controls for guiding the user to select a media attribute. The media attributes may include, e.g., the type of music related to the media, the media language, the media publishing time, etc. It is also possible for the electronic device 110 to present a control to guide the user to select a recommended playlist from another user of the application 120. The other user and the user 102 can have social relationship in the application 120 and have permission to play the recommended playlists of each other.

Referring back to FIG. 2, at block 230, the electronic device 110 receives a user's selection of a target control of the first set of controls in the second user interface. In response to receiving the selection, at block 240, the electronic device 110 switches the currently played first media item displayed on the first user interface to a second media item. The second media item is selected from the media library associated with the target media playback scenario corresponding to the selected target control.

In some embodiments, the user 102 is only allowed to select a target control in a same set of controls. That is, if the user 102 selects a target control in the first set of controls 331 to 334, any controls from the second set of controls 321 to 323 and/or third set of controls are disabled to be selected by the user 102, and vice versa. In some other embodiments, the selection by the user 102 can be a combination of a plurality of target controls from different sets of controls. For example, the user can select a control from each of the first and second sets of controls.

If the electronic device 110 receives a user's selection for the target control that satisfies the predetermined combination mode/number, the electronic device 110 switches the currently played media item to another media item that satisfies the user's input playback preference.

In some embodiments, if the electronic device 110 receives a user selection for the control 332 on the interface 300C, the electronic device 110 can cease presenting the interface 300C.

Figure 4:
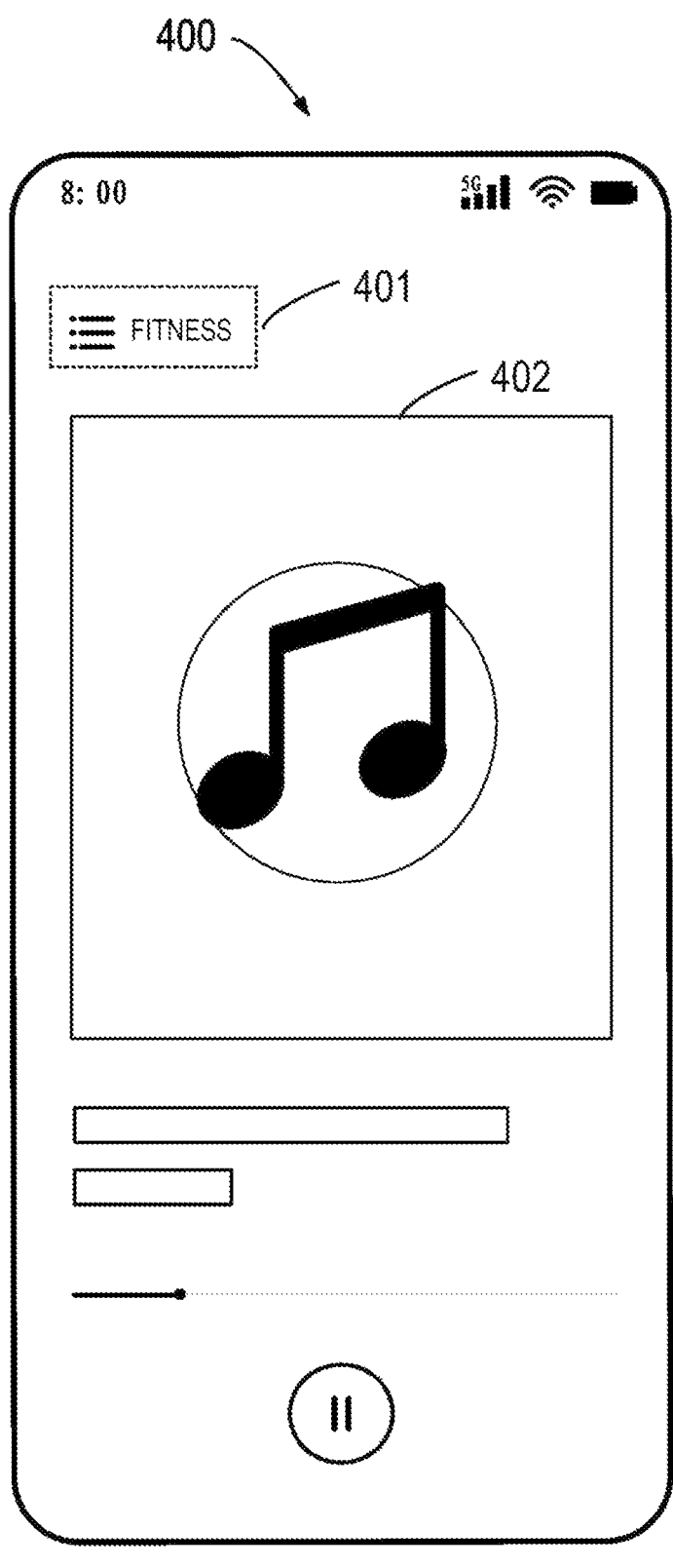
FIG. 4 shows a schematic diagram of a user interface according to an embodiment of the present disclosure.

FIG. 4 illustrates another example interface 400 of an application in accordance with an embodiment of the present disclosure. For example, if a user selection for the control 332 is received on the interface 300C, the electronic device 110 may render the interface 400 while ceasing display of the interface 300C. The interface 400 is the media playback interface of the application 120, i.e., the first user interface as described above.

If the electronic device 110 receives the user's selection for the control 332 on the interface 300C, the currently played media item 301 displayed in the interface 300A is switched to the displayed media item 402 in the interface 400. The media item 402 is selected from the media library associated with the media playback scenario (e.g., fitness) corresponding to the control 332. That is, once the electronic device 110 receives the user's selection for the control 332 on the interface 300C, the switched media item 402 will replace the media item 301 and become the currently played media item.

Alternatively, or in addition, a label corresponding to the target media playback scenario control 332 selected by the user can be presented in the interface 400. For example, the display area 401 of the interface 400 presents a label 401 to indicate that the currently played media item 402 is related to the target media playback scenario selected by the user. As such, the user can intuitively and clearly know the media playback scenario corresponding to one or more currently recommended media items. It should be understood that if the user selects another control, a label corresponding to the other control which is selected can be presented on the interface 400.

In other embodiments, if the electronic device 110 receives a user's selection for the target control on the second user interface, the electronic device 110 can switch the currently played media item displayed on the first user interface to another media item which is selected from the media library associated with the target media playback scenario corresponding to the selected target control, while still presenting the second user interface.

For example, if the electronic device 110 receives the user's selection for the control 332 on the interface 300C, the electronic device 110 can continue to present the interface 300C. However, the currently played media item, such as the media item 301 presented from the interface 300A, is switched to the media item 402 displayed on the interface 400. That is to say, even if the electronic device 110 maintains the presentation of the second user interface, the currently played media item displayed on the first user interface, which is covered by the second user interface, will be switched.

In this way, the user can more conveniently select the desired media playback scenario by selecting media playback scenarios with strong pre-universality and sufficient content supply. After the user selects the scenario, the switched media items associated with the selected scenario are immediately provided to the user, making the user more willing to consume on the homepage. At the same time, the user's consumption behavior for different media playback scenarios can also be collected to further optimize the media recommendation algorithm and improve the accuracy of media recommendation.

Figure 5A:
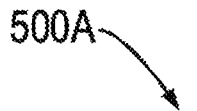
FIGS. 5A to 5B show schematic diagrams of a user interface according to some embodiments of the present disclosure.
Figure 5B:
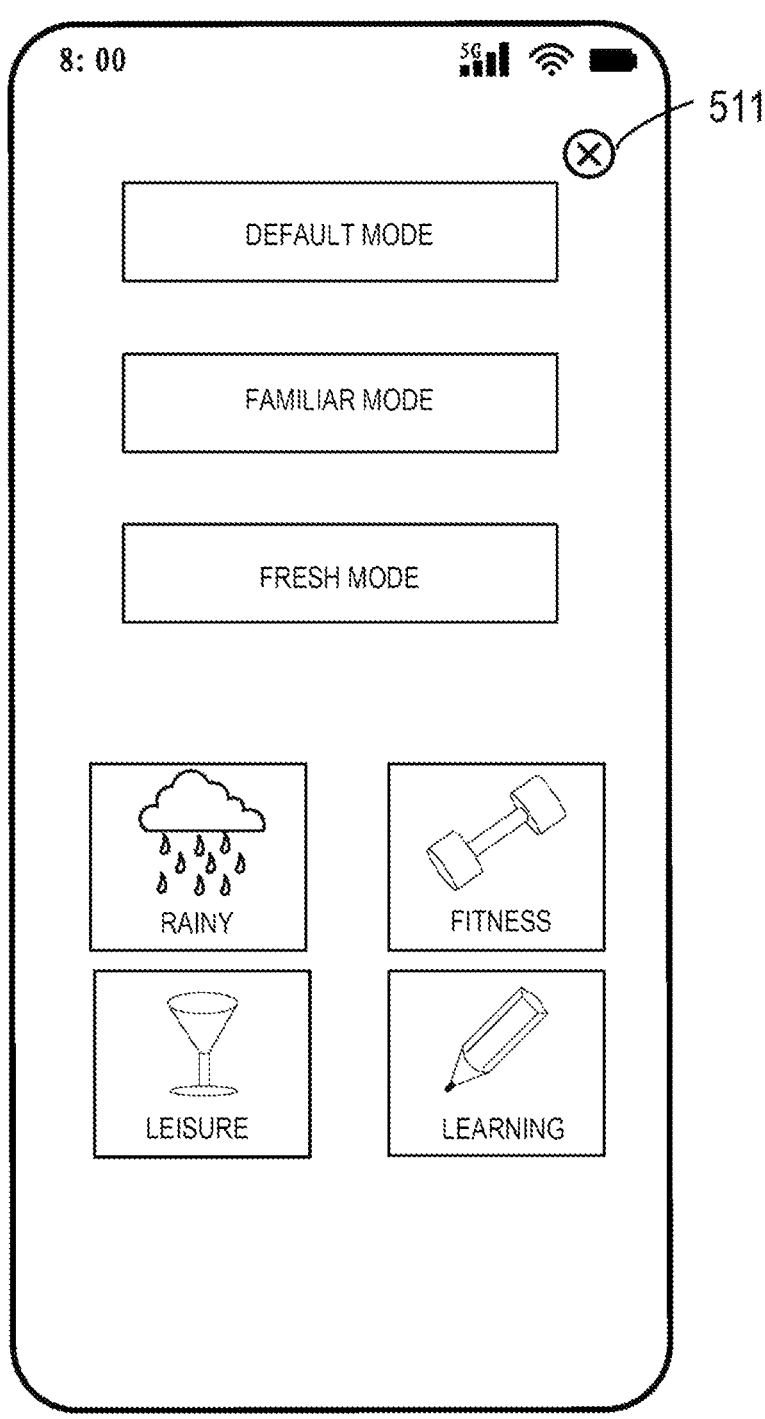

Further, in some other embodiments, the electronic device 110 may also cease display of the second user interface in the case that the user does not select a target control. FIGS. 5A and 5B illustrate example interfaces 500A and 500B of an application according to embodiments of the present disclosure.

For example, as shown in FIG. 5A, the interface 500A provides an interface element 501 that guides the user to exit the second user interface by performing a specific operation. In this case, if a sliding operation of the user 102 along the specified direction (such as the second direction 502) is detected on the interface 500A, the electronic device 110 can exit the display of the second user interface and restore the display of the interface 300A or 300B. For example, as shown in FIG. 5B, the interface 500A provides an interface element 511 that guides the user to exit the second user interface. In this case, if the selection of the interface element 511 by the user 102 is detected on the interface 500B, the electronic device 110 can cease the display of the second user interface and restore the display of the interface 300A or 300B.

In some other embodiments, in the case that the electronic device 110 does not present an interface element guiding the exit of the second user interface, if the electronic device 110 detects a specific operation of the user, such as sliding in a predetermined direction, on the interface 300C, or if it is detected that the time duration that the user makes no operation exceeds a threshold while the interface 300C is presented, the electronic device 110 can cease the display of the second user interface and restore the display of the interface 300A or 300B.

According to embodiments of the present disclosure, it is possible to guide users to input and/or change media playback preferences in a simple manner, so as to achieve more accurate media recommendation of media playback applications, thereby further improving customer stickiness.

Figure 6:
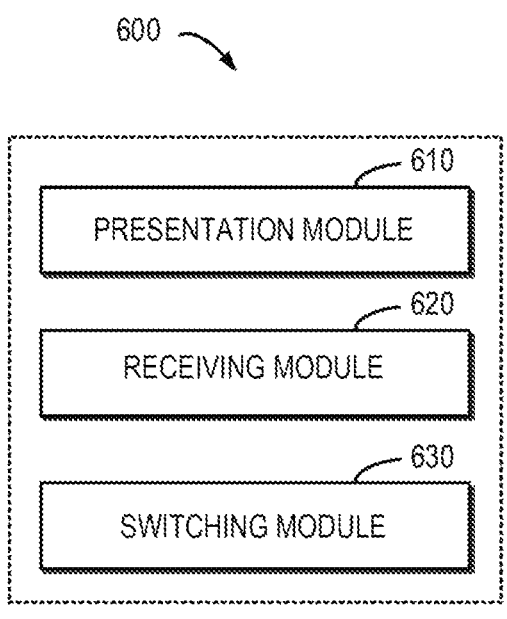
FIG. 6 shows a block diagram of a device for controlling a media player application according to some embodiments of the present disclosure.

Embodiments of the present disclosure also provide corresponding apparatus for implementing the above methods or processes. FIG. 6 shows a block diagram of a apparatus 600 for controlling a media player application according to some embodiments of the present disclosure.

As shown in FIG. 6, the apparatus 600 comprises a presentation module 610 configured to present a second user interface of the media playback application in response to detecting a predetermined user operation in a first user interface of the media playback application, the second user interface comprising at least a first set of controls associated with media playback scenarios.

The apparatus 600 also comprises a receiving module 620 configured to receive a user's selection of a target control in the first set of controls.

In addition, the apparatus 600 comprises a switching module 630 configured to, in response to the selection, switch a currently played first media item displayed on the first user interface to a second media item, the second media item selected from a media library associated with a target media play scenario corresponding to the target control.

In some embodiments, the predetermined user operation includes at least one of the following: one or more sliding operations in a first direction on the first user interface, or an operation of an interface element displayed on the first user interface for accessing the second user interface.

In some embodiments, the presentation module 610 may also be configured to slide the second user interface into the display screen in a predetermined direction.

In some embodiments, the presentation module 610 may also be configured to display a sidebar as the second user interface on a side of the first user interface such that the second user interface covers a portion of the first user interface.

In some embodiments, the second user interface further comprises a second set of controls for adjusting the media recommendation mode; and/or a third set of controls for selecting a media attribute, the media attribute comprising at least one of: media publishing time, media language, or a type of music related to the media.

In some embodiments, the switching module 630 is further configured to switch the currently played first media item displayed on the first user interface to the second media item without ceasing display of the second user interface.

In some embodiments, the apparatus 600 may also be configured to cease display of the second user interface in response to at least one of: a selection of the target control, an operation of an interface element displayed on the second user interface for closing the second user interface, a sliding operation in a second direction on the second user interface, or the display of the second user interface exceeding a predetermined duration without detecting an operation for the at least one set of controls.

In some embodiments, ceasing the display of the second user interface comprises restoring display of the first user interface, the restored first user interface displaying information associated with the selected target control.

In some embodiments, for a newly registered user of the media playback application, the interface element for accessing the second user interface is displayed in response to a predetermined time elapsing from completion of registration. Alternatively, for an existing registered user of the media playback application, the interface element for accessing the second user interface is displayed in response to a cold start of the media playback application.

In some embodiments, in response to a first control from the first set of controls being selected as the target control, the second and third sets of controls are disabled for selection. Alternatively, in response to a first control from the first set of controls being selected as the target control, at least one second control is enabled to be selected as the target control, the at least one second control selected from at least one of the second and third sets of controls.

The modules included in apparatus 600 can be implemented in various ways, including software, hardware, firmware, or any combination thereof. In some embodiments, one or more units can be implemented using software and/or firmware, such as machine-executable instructions stored on a storage medium. In addition to or instead of machine-executable instructions, some or all of the modules in apparatus 600 can be implemented at least in part by one or more hardware logic components. By way of example and not limitation, example types of hardware logic components that can be used include field programmable gate arrays (FPGAs), application specific integrated circuits (ASICs), application specific standards (ASSPs), system-on-chips (SOCs), complex programmable logic devices (CPLDs), and the like.

Figure 7:
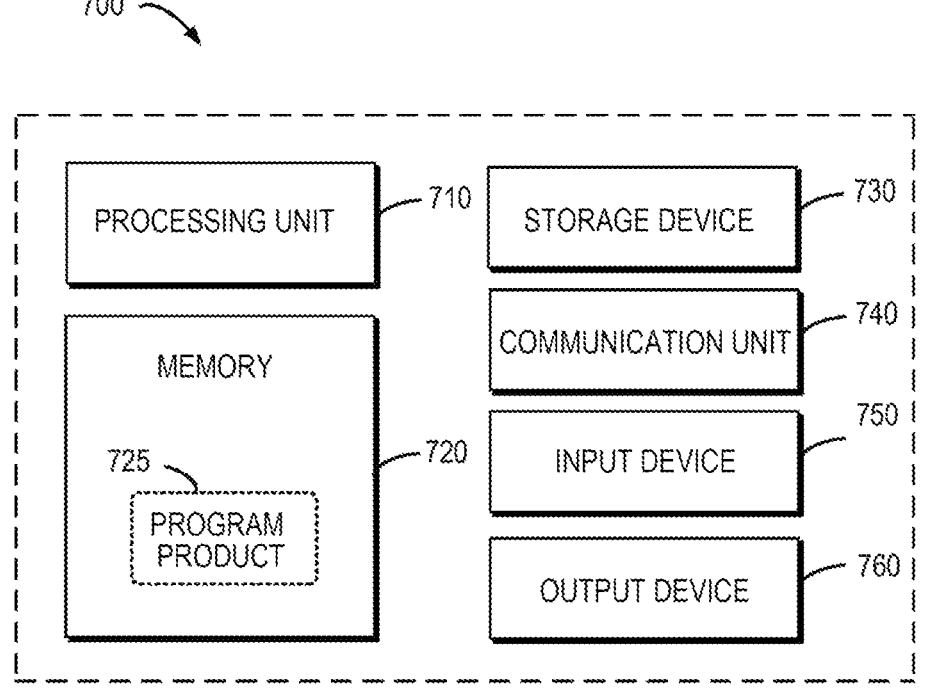
FIG. 7 shows a block diagram of a device that can implement multiple embodiments of the present disclosure.

FIG. 7 illustrates a block diagram of an electronic device/server 700 in which one or more embodiments of the present disclosure may be implemented. the electronic device 110 of FIG. 1 may be implemented, for example, by the electronic device/server 700 shown in FIG. 7. it should be understood that the electronic device/server 700 shown in FIG. 7 is merely for illustration and should not constitute any limitation on the functionality and scope of the embodiments described herein.

As shown in FIG. 7, the electronic device/server 700 is in the form of a general purpose electronic device. components of the electronic device/server 700 may include, but are not limited to, one or more processors or processing units 710, memory 720, storage device 730, one or more communication units 740, one or more input devices 760, and one or more output devices. the processing unit 710 may be an actual or virtual processor and is capable of performing various processes based on programs stored in the memory 720. in a multiprocessor system, multiple processing units execute computer executable instructions in parallel to improve the parallel processing capability of the electronic device/server 700.

Electronic device/server 700 typically includes multiple computer storage media. Such media can be any available media accessible to electronic device/server 700, including but not limited to volatile and non-volatile media, removable and non-removable media. Memory 720 can be volatile memory (such as registers, caches, random access memory (RAM)), non-volatile memory (such as read-only memory (ROM), electrically erasable programmable read-only memory (EEPROM), flash memory), or some combination thereof. Storage device 730 can be removable or non-removable media, and can include machine-readable media such as flash drives, disks, or any other media that can be used to store information and/or data (such as training data for training) and can be accessed within electronic device/server 700.

The electronic device/server 700 may further include additional removable/non-removable, volatile/non-volatile storage media. Although not shown in FIG. 7, a disk drive for reading or writing from a removable, non-volatile disk (e.g., a "floppy disk") and an optical disk drive for reading or writing from a removable, non-volatile optical disk may be provided. In these cases, each drive may be connected to a bus (not shown) by one or more data media interfaces. The memory 720 may include a computer program product 725 having one or more program modules configured to perform various methods or acts of various embodiments of the present disclosure.

The communication unit 740 implements communication with other electronic devices through a communication medium. additionally, the functions of the components of the electronic device/server 700 may be implemented in a single computing cluster or multiple computing machines capable of communicating through communication connections. thus, the electronic device/server 700 may operate in a networked environment using logical connections with one or more other servers, a network personal computer (PC), or another network node.

The input device 750 may be one or more input devices, such as a mouse, keyboard, trackball, etc. The output device 760 may be one or more output devices, such as a display, speaker, printer, etc. The electronic device/server 700 may also communicate, as desired, via the communication unit 740, with one or more external devices (not shown), such as storage devices, display devices, etc., with one or more devices that enable a user to interact with the electronic device/server 700, or with any device (e.g., network interface card, modem, etc.) that enables the electronic device/server 700 to communicate with one or more other electronic devices. Such communication may be performed via an input/output (I/O) interface (not shown).

According to example implementations of the present disclosure, a computer-readable storage medium is provided having one or more computer instructions stored thereon, wherein the one or more computer instructions are executed by a processor to implement the methods described above.

Various aspects of the present disclosure are described herein with reference to flowcharts and/or block diagrams of methods, apparatus (systems), and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions may be provided to a processing unit of a general purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions includes an article of manufacture that includes instructions for implementing various aspects of the functions/actions specified in one or more blocks in the flowchart and/or block diagrams.

Computer-readable program instructions can also be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks can actually be executed in parallel, and they can sometimes be executed in the opposite order, depending on the functions involved. It should also be noted that each block in the diagrams and/or flowcharts, as well as combinations of blocks in the diagrams and/or flowcharts, can be implemented using a dedicated hardware-based system that performs the specified functions or actions, or can be implemented using a combination of dedicated hardware and computer instructions.

The above has described the various implementations of the present disclosure. The above description is example, not exhaustive, and is not limited to the various implementations disclosed. Without departing from the scope and spirit of the various implementations described, many modifications and changes are obvious to those skilled in the art. The choice of terminology used in this article is intended to best explain the principles, practical applications, or improvements to the technology in the market, or to enable other ordinary technicians in the art to understand the various implementations disclosed in this article.

We claim:

1. A method of controlling a media player application, comprising:

in response to detecting a predetermined user operation in a first user interface of the media playback application, presenting a second user interface of the media playback application, the second user interface comprising at least a first set of controls associated with media playback scenarios;

receiving a user's selection of a target control in the first set of controls; and in response to the selection, switching a currently played first media item displayed on the first user interface to a second media item, the second media item selected from a media library associated with a target media play scenario corresponding to the target control, wherein the second user interface further comprises:

a second set of controls for adjusting media recommendation modes; and a third set of controls for selecting a media attribute, the media attribute comprising at least one of: media publishing time, media language, or a type of music related to the media.

2. The method of claim 1, wherein the predetermined user operation comprises at least one of: one or more sliding operations in a first direction on the first user interface, or an operation of an interface element displayed on the first user interface for accessing the second user interface.

3. The method of claim 2, wherein for a newly registered user of the media playback application, the interface element for accessing the second user interface is displayed in response to a predetermined time elapsing from completion of registration, or for an existing registered user of the media playback application, the interface element for accessing the second user interface is displayed in response to a cold start of the media playback application.

4. The method of claim 1, wherein presenting the second user interface comprises: causing the second user interface to slide into the display screen in a predetermined direction.

5. The method of claim 1, wherein presenting the second user interface comprises: displaying a sidebar as the second user interface on a side of the first user interface such that the second user interface covers a portion of the first user interface.

6. The method of claim 1, wherein switching the first media item to the second media item comprises: switching the currently played first media item displayed on the first user interface to the second media item without ceasing display of the second user interface.

7. The method of claim 1, further comprising: ceasing display of the second user interface in response to at least one of: a selection of the target control, an operation of an interface element displayed on the second user interface for closing the second user interface, a sliding operation in a second direction on the second user interface, or display of the second user interface exceeding a predetermined duration without detecting an operation for the at least one set of controls.

8. The method of claim 7, wherein ceasing the display of the second user interface comprises: restoring display of the first user interface, the restored first user interface displaying information associated with the selected target control.

9. The method of claim 1, wherein in response to a first control from the first set of controls being selected as the target control, the second and third sets of controls are disabled for selection, or in response to a first control from the first set of controls being selected as the target control, at least one second control is enabled to be selected as the target control, the at least one second control selected from at least one of the second and third sets of controls.

10. An electronic device comprising: at least one processing unit; and at least one memory coupled to the at least one processing unit and storing instructions for execution by the at least one processing unit, the instructions, when executed by the at least one processing unit, causing the device to perform a method of controlling a media player application, the method comprising: in response to detecting a predetermined user operation in a first user interface of the media playback application, presenting a second user interface of the media playback application, the second user interface comprising at least a first set of controls associated with media playback scenarios; receiving a user's selection of a target control in the first set of controls; and in response to the selection, switching a currently played first media item displayed on the first user interface to a second media item, the second media item selected from a media library associated with a target media play scenario corresponding to the target control, wherein the second user interface further comprises:

a second set of controls for adjusting media recommendation modes; and a third set of controls for selecting a media attribute, the media attribute comprising at least one of: media publishing time, media language, or a type of music related to the media.

11. The electronic device of claim 10, wherein the predetermined user operation comprises at least one of: one or more sliding operations in a first direction on the first user interface, or an operation of an interface element displayed on the first user interface for accessing the second user interface.

12. The electronic device of claim 11, wherein for a newly registered user of the media playback application, the interface element for accessing the second user interface is displayed in response to a predetermined time elapsing from completion of registration, or for an existing registered user of the media playback application, the interface element for accessing the second user interface is displayed in response to a cold start of the media playback application.

13. The electronic device of claim 10, wherein presenting the second user interface comprises: causing the second user interface to slide into the display screen in a predetermined direction.

14. The electronic device of claim 10, wherein presenting the second user interface comprises: displaying a sidebar as the second user interface on a side of the first user interface such that the second user interface covers a portion of the first user interface.

15. The electronic device of claim 10, wherein switching the first media item to the second media item comprises: switching the currently played first media item displayed on the first user interface to the second media item without ceasing display of the second user interface.

16. The electronic device of claim 10, the method further comprising: ceasing display of the second user interface in response to at least one of: a selection of the target control, an operation of an interface element displayed on the second user interface for closing the second user interface, a sliding operation in a second direction on the second user interface, or the display of the second user interface exceeding a predetermined duration without detecting an operation for the at least one set of controls.

17. The electronic device of claim 16, wherein ceasing the display of the second user interface comprises: restoring display of the first user interface, the restored first user interface displaying information associated with the selected target control.

18. A non-transitory computer readable storage medium having a computer program stored thereon, the computer program, when executed by a processor, implementing a method of controlling a media player application, the method comprising: in response to detecting a predetermined user operation in a first user interface of the media playback application, presenting a second user interface of the media playback application, the second user interface comprising at least a first set of controls associated with media playback scenarios; receiving a user's selection of a target control in the first set of controls; and in response to the selection, switching a currently played first media item displayed on the first user interface to a second media item, the second media item selected from a media library associated with a target media play scenario corresponding to the target control, wherein the second user interface further comprises:

a second set of controls for adjusting media recommendation modes; and a third set of controls for selecting a media attribute, the media attribute comprising at least one of: media publishing time, media language, or a type of music related to the media.

\* \* \* \* \*